United States Patent [19]

Meyer

[11] 3,860,584
[45] Jan. 14, 1975

[54] 4,4'-BIS-[BENZOXAZOLYL-(2)]-STILBENES

[75] Inventor: Hans Rudolf Meyer, Binningen, Switzerland

[73] Assignee: Ciba-Geigy AG, Basel, Switzerland

[22] Filed: Oct. 16, 1972

[21] Appl. No.: 298,188

[30] Foreign Application Priority Data
Oct. 21, 1971 Switzerland..................... 15405/71
Apr. 14, 1972 Switzerland..................... 5595/72

[52] U.S. Cl..................... 260/240 CA, 117/33.5 T, 252/301.2 W
[51] Int. Cl............................................ C07d 85/48
[58] Field of Search ............................. 260/240 CA

[56] References Cited
UNITED STATES PATENTS
3,586,673 6/1971 Bloom et al. ..................... 260/240
FOREIGN PATENTS OR APPLICATIONS
1,072,914 6/1967 Great Britain..................... 260/240
1,072,918 6/1967 Great Britain..................... 260/240

*Primary Examiner*—Henry R. Jiles
*Assistant Examiner*—C. M. S. Jaisle
*Attorney, Agent, or Firm*—Joseph G. Kolodny; Edward McC. Roberts; Prabodh I. Almaula

[57] ABSTRACT

The present invention provides new stilbene derivatives of the formula

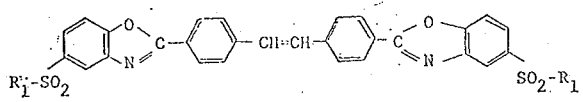

wherein $R_1$ represents an alkyl group with 1 – 4 C atoms, phenyl or benzyl, and phenyl and benzyl can be substituted by chlorine or methyl.

These compounds are useful optical brighteners for polyester and polyamide materials.

4 Claims, No Drawings

4,4'-BIS-[BENZOXAZOLYL-(2)]-STILBENES

The invention relates to selected substitution products of 4,4'-bis-[benzoxyzolyl-(2)]-stilbene and their use as optical brighteners for polyester or polyamide bulk material.

It has already been known for a long time that 4,4'-bis-benzoxazolyl-stilbenes can be used as optical brighteners - inter alia also for the bulk brightening of polyesters and polyamides. Amongst the large number of substitution products of 4,4'-bis-benzoxazolyl-stilbene, sulphonyl derivatives have also been mentioned as systems capable of fluorescence, without, however, a member of these types ever having attained practical importance. In fact, it is also found that the compounds hitherto mentioned — if they are capable of fluorescence at all — give strongly greenish-tinged effects when used in practice, that is to say their application is not of interest.

The present invention is based on the recognition that particularly in the case of alkylsulphonyl and phenylsulphone derivatives there exists an unexpected positional dependence of the brightening effect.

It has been found that selected compounds, namely those which correspond to the formula (1) 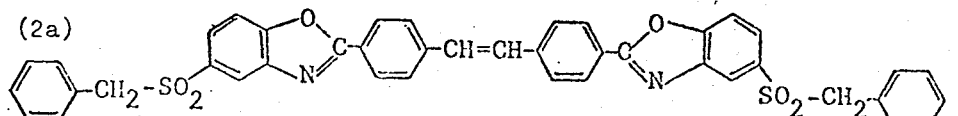

wherein $R_1$ denotes an alkyl group with 1 - 4 C atoms, phenyl or benzyl, and phenyl and benzyl can further be substituted by chlorine or methyl, give extremely brilliant brightening effects and are thus in conspicuous contrast to the nearest related positional isomers, the 6-alkylsulphone and 6-phenylsulphone derivatives.

Within the framework of the above formula, compounds of particular practical interest are those of the formulae (1a) 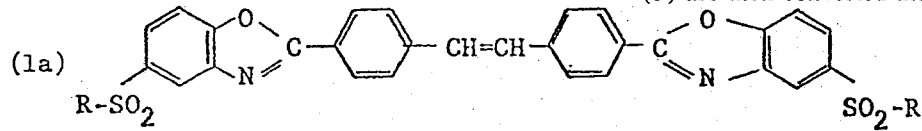

wherein R represents an alkyl group with 1–4 C atoms, or phenyl (2) 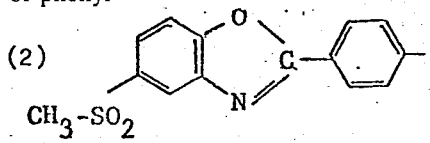

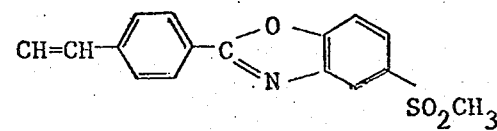

(2a) 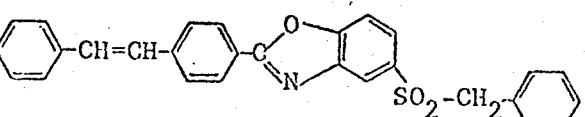

The compounds defined above can be manufactured analogously to processes which are in themselves known. Appropriately, for example, stilbene-4,4'-dicarboxylic acid or a derivative of this dicarboxylic acid is subjected to an oxazole cyclisation reaction with approximately a two-fold molar amount of an aminophenol, in accordance with the following formulae:

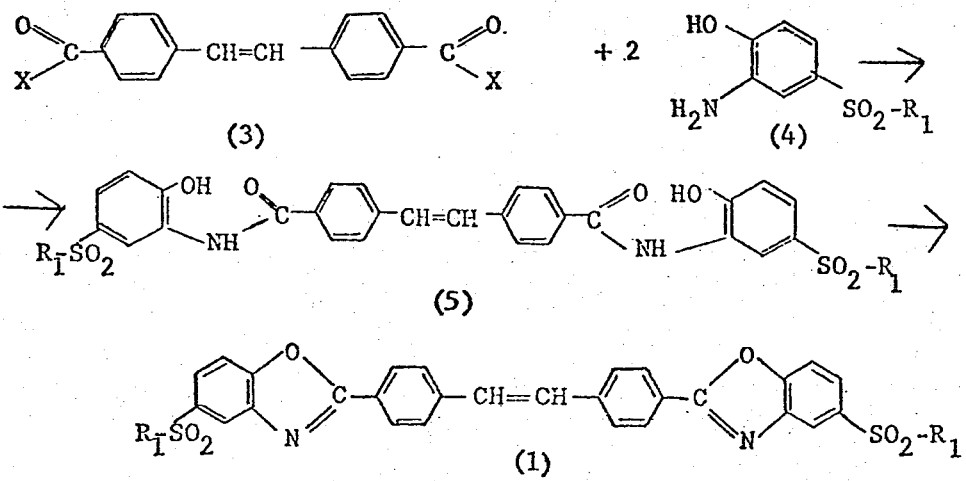

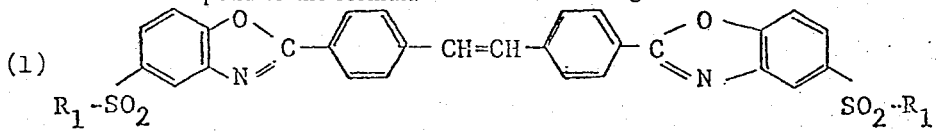

In these formulae, X denotes a hydroxyl group, a lower alkoxy group or chlorine, whilst R has the abovementioned meaning.

The 1st stage (acylation) is appropriately carried out at temperatures of 20° to 200°C, preferably in an organic solvent which is inert towards the reactants. Appropriately, stilbenedicarboxylic acid chloride is used and is condensed with the aminophenols in the presence of an organic solvent, such as dioxane, xylene, chlorobenzene, dichlorobenzene, trichlorobenzene or nitrobenzene, or in an inert amine such as N,N-dimethylaniline, pyridine, picolines, triethylamine, quinoline and the like, which bind the hydrogen halide liberated; the resulting acyl compounds of the formula (5) are then converted into the oxazole derivatives at temperatures of between 120° and 350°C, if appropriate in the presence of a catalyst. If stilbenedicarboxylic acid chloride is used as the starting substance, it can be manufactured immediately prior to the condensation with the o-amino compound, and without isolation, from the free carboxylic acid and thionyl chloride, optionally with the addition of a catalyst (such as pyridine), in the solvent in which the condensation subsequently takes place.

The 2nd step (cyclisation reaction) then takes place at temperatures of 120° to 350°C, preferably in the presence of a high-boiling inert organic solvent and optionally of a catalyst, advantageously whilst passing in a stream of an inert gas, for example nitrogen, in order to remove the water formed in the reaction.

As organic solvents for the 2nd stage it is in part possible to use the same substances as for the 1st stage, but especially high-boiling partially polar solvents, such as dichlorobenzene, trichlorobenzene, chlorinated biphenyl, nitrobenzene or nitrotoluene, dimethylformamide or dimethylacetamide, dimethylsulphoxide, N-methylpyrrolidone, tetramethylenesulphone, phosphoric acid tris-(dimethylamide), optionally etherified oxide compounds, such as propylene glycol, ethylene glycol monomethyl ether, diethylene glycol, diethylene glycol monobutyl ether or diethylene glycol diethyl ether, and high-boiling esters of phthalic acid, such as phthalic acid dibutyl ester.

Suitable agents for splitting off water, or suitable catalysts, are, for example, boric acid, boric anhydride, boron trifluoride, zinc chloride, p-toluenesulphonic acid, phosphorus oxychloride, thionyl chloride and polyphosphoric acid, including pyrophosphoric acid.

The synthesis of compounds according to the general formula (1) can in principle also be carried out in a one-step process, starting from compounds of the formula (3) and o-aminophenols of the formula (4), by heating these components together to elevated temperatures, appropriately between 120° and 350°C, in the melt or in a solvent which at the same time acts as a condensation agent, such as polyphosphoric acid, phosphorus oxychloride or fused zinc chloride.

Amongst further possible manufacturing processes, the reaction of 4,4'-dicyanostilbene with o-aminophenols of the formula (4) at elevated temperatures, preferably 160° to 260°C, may be mentioned. This reaction is appropriately carried out in the presence of agents which bind ammonia such as, for example, phosphoric acid, polyphosphoric acid or phosphorus pentoxide, under an inert gas.

Another manufacturing process for compounds of the formula (1) consists of the condensation of o-halogenoanilines of the formula

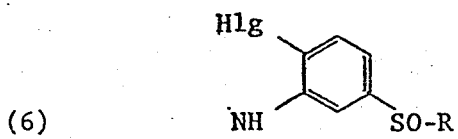

wherein Hlg = chlorine or bromine, with a compound of the formula (3), in accordance with methods which are in themselves known, to give the acid amide of the formula

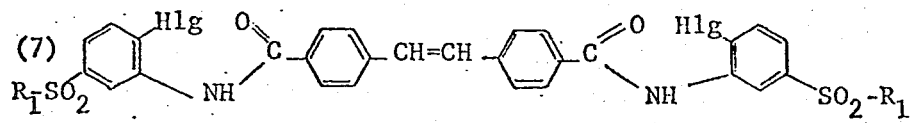

followed by cyclisation in the presence of polar solvents, such as dimethylformamide, dimethylsulphoxide, N-methylpyrrolidone or nitrobenzene, in the presence of copper catalysts such as copper-I chloride, copper-II chloride, copper oxides, elementary finely divided copper and agents which bind hydrogen halide, such as alkali acetate, magnesium oxide or organic bases such as pyridine.

The stilbenedicarboxylic acid or its derivatives, to be used as the starting material, are known.

The manufacture of 2-amino-4-methyl-sulphonylphenol and of 2-amino-4-ethyl-sulphonylphenol is described by D. Simov et al. [C.A. 66 (1967) 115 401 m].

4-Alkylsulphonyl-2-aminophenols or 4-benzylsulphonyl-2-aminophenols are also obtained by alkylation of 1-chloro-2-nitrobenzenesulphinic acid with dialkyl sulphates such as dimethyl sulphate or diethyl sulphate, or with alkyl halides such as ethyl bromide or benzyl halides such as benzyl chloride, hydrolysis of the resulting (Ar)-alkylsulphone derivative in boiling sodium hydroxide solution to give the nitrophenols and subsequent reduction of the nitro group, for example with sodium sulphide (British Pat. No. 667.168). The higher 4-chloro-3-nitro-alkylsulphones can more readily be manufactured by nitration of the corresponding p-chloro-phenyl-alkylsulphones (U.S. Pat. No. 2,938,042).

The new compounds defined above show, in the dissolved or finely divided state, a more or less pronounced fluorescence. They can be used for the optical brightening of various synthetic organic materials, such as polyesters based on dicarboxylic acid/diol, especially saturated polyester (for example ethylene glycol terephthalic acid polyester), polyamides based on dicarboxylic acid/diamine (for example hexamethylenediamine adipate) or aminocarboxylic acids or lactams (for example polycaprolactam), as well as their precondensates and co-condensates.

The organic materials to be optically brightened can be in the most diverse states of processing (raw materials, semi-finished goods or finished goods). On the other hand, they can be in the form of the most diverse shaped structures, that is to say, for example, predominantly three-dimensional articles such as slabs, profiles, injection mouldings, various machined articles, chips, granules or foams, and also as predominantly two-dimensional articles such as films, sheets, lacquers, coverings, impregnations and coatings, or predominantly one-dimensional articles such as filaments, fibres, flocks and wires. The said materials can on the other hand also be present in unshaped states, in the most diverse homogeneous or inhomogeneous forms of division, such as, for example, as powders, solutions, emulsions and dispersions.

The shaping of such materials is effected, for example, by spinning processes or via spinning compositions, in which case the optical brighteners can be applied in accordance with the following processes.

Addition to the starting substances (for example monomers) or intermediate products (for example precondensates and prepolymers), that is to say before or during the polymerisation, polycondensation or polyaddition, sprinkling onto polymer chips or granules for spinning compositions, or metered addition to spinning melts or spinning solutions.

The new optical brighteners according to the present invention can also be employed as mixtures with dyestuffs (shading) or pigments (colour pigments or, in particular, for example white pigments).

In certain cases the brighteners are rendered fully effective by an after-treatment. This can consist, for example, of a chemical bleaching process (treatment with hydrogen peroxide or chlorite).

The amount of the new optical brighteners to be used according to the invention, relative to the material to be optically brightened, can vary within wide limits. A distinct and durable effect is already achievable in certain cases with very small amounts, for example amounts of 0.001 percent by weight. However, amounts of up to about 0.5 percent by weight can also be employed. For most practical requirements, amounts of between 0.005 and 0.2 percent by weight are of preferential interest.

In the examples parts, unless otherwise stated, are always parts by weight and percentages are always percentages by weight. Unless otherwise stated, melting points and boiling points are uncorrected and are determined in an evacuated capillary.

EXAMPLE 1

61.0 g of stilbenedicarboxylic acid dichloride and 78.6 g of 2-amino-4-methylsulphonyl-phenol are stirred into 400 ml of pyridine and the mixture is heated under reflux for 2 hours. It is cooled to room temperature, 400 ml of water are added and the product which precipitates is filtered off and washed with 100 ml of methanol and then repeatedly with water. After drying, 106.0 g of the acid amide of the formula (8)

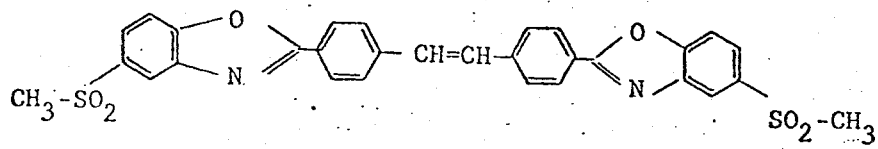

which melts, with decomposition, at about 354°C. are obtained.

12.1 g of acid amide in 70 ml of dibutyl phthalate are heated to the boil, whilst passing nitrogen over the mixture, until the amide dissolves, with cyclisation occurring (approx. one-half hour) whilst at the same time the water formed, together with approx. 10 ml of solvent, is distilled off. After cooling to room temperature, the precipitate is filtered off, washed twice with 10 ml of ethyl acetate at a time and five times with 10 ml of methanol at a time, and dried. 8.0 g of the dibenzoxazolyl compound of the formula (9)

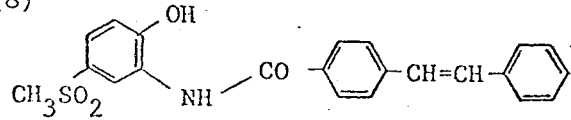

are obtained; after 2 recrystallisations from N-methylpyrrolidone with the aid of active charcoal and fuller's earth, the compound melts at 383° – 385°C.

EXAMPLE 2

If the procedure described in Example 1 is followed but the aminophenol component used is 2-amino-4-ethylsulphonylphenol or 2-amino-4-phenylsulphonyl-phenol, the dibenzoxazoles of the formulae (10)

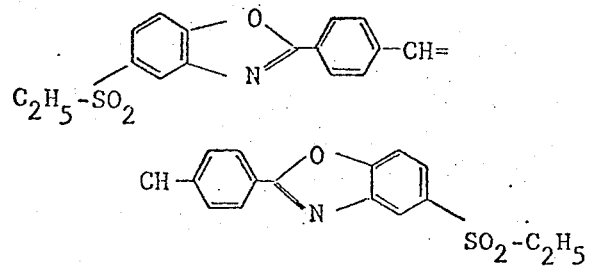

melting point 339° – 340°C (after two recrystallisations from N-methylpyrrolidone) and (11)

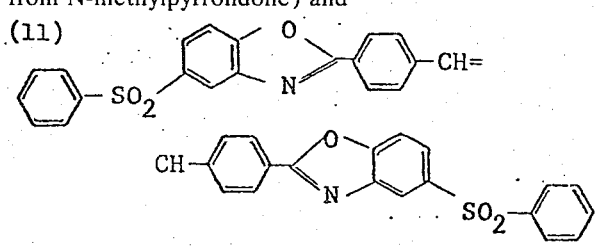

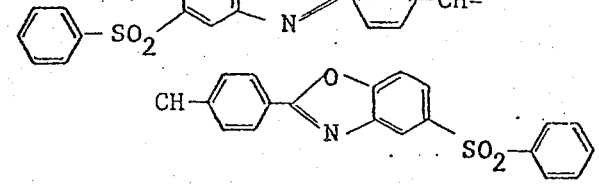

melting point 366° – 368°C (after two recrystallisations from N-methylpyrrolidone) are respectively obtained.

2-Amino-4-phenylsulphonyl-phenol is obtained, for example, according to British Patent Specification No. 743,907.

EXAMPLE 3

If the procedure described in Example 1 is followed but the aminophenol component used is 2-amino-4-benzylsulphonylphenol, 2-amino-4-(p-chlorophenyl)-

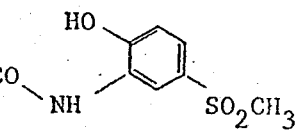

sulphonyl-phenol or 2-amino-4-propylsulphonyl-phenol, the corresponding dibenzoxazoles of the formulae (12)

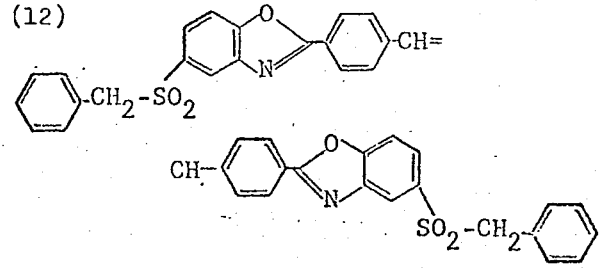

melting point 380°C (after two recrystallisations from N-methylpyrrolidone) and
melting point >400°C (after two recrystallisations from

(13) 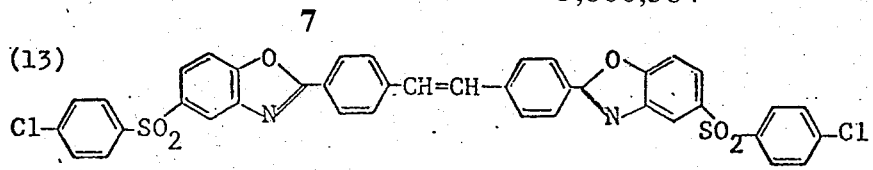

N-methylpyrrolidone) and

(14) 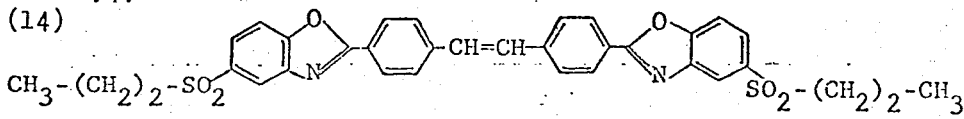

melting point 325°C (after recrystallisation from dimethylformamide and dichlorobenzene) are respectively obtained.

The 2-amino-4-benzylsulphonyl-phenol used as the starting product, of melting point 186° – 187°C, is obtained by reduction of 2-nitro-4-benzylsulphonyl-phenol (melting point 173° – 174°C) [Chem. Abstr. 55 (1961) 18647e] with Raney nickel in methylcellosolve at room temperature.

2-Amino-4-(p-chlorophenyl)-sulphonyl-phenol of melting point 185° – 187°C is obtained by saponification of 4,4'-dichloro-3-nitrodiphenylsulphone (J. D. Loudon and T. D. Robson, J. Chem. Soc. 1937, 242 – 246) with boiling sodium hydroxide solution to give 2-nitro-4-(p-chlorophenyl)-sulphonyl-phenol of melting point 192° – 194°C, and subsequent hydrogenation with Raney nickel in methylcellosolve.

2-Amino-4-n-propylsulphonyl-phenol of melting point 140° – 141°C is obtained from 4-chloro-3-nitrophenyl-n-propylsulphone (U.S. Pat. No. 2,938,042) via 2-nitro-4-n-propylsulphonyl-phenol (melting point 100° – 101°C in accordance with the methods described above.

EXAMPLE 4

In a similar manner to that described in Example 1, the appropriate aminophenols yield the compounds described below:

(15) 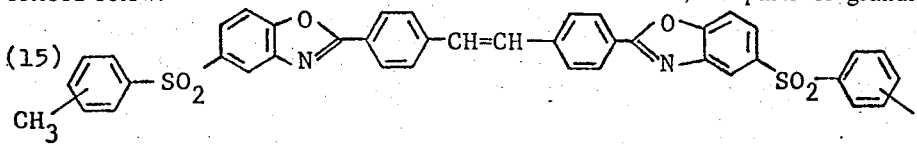

Isomer mixture ($CH_3$ in the o-position and predominantly the p-position), melting point 323° (after recrystallisation from dimethylformamide and o-dichlorobenzene).

(16) 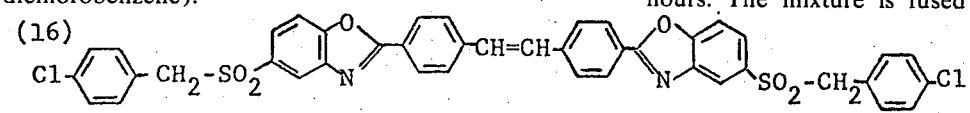

Melting point 370° (after recrystallisation from N-methylpyrrolidone and trichlorobenzene).

(17) 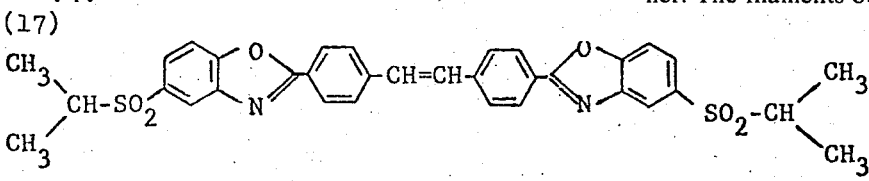

Melting point 340° (after recrystallisation from dimethylformamide and o-dichlorobenzene).
Also

(18) 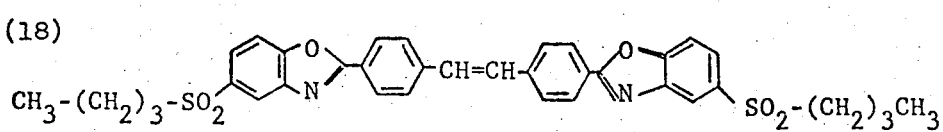

The 2-amino-4-(p-o-tolylsulphonyl)-phenol isomer mixture used as the starting product is obtained by reduction of the corresponding nitro compound, which is manufactured according to J. D. Loudon [J.Chem.Soc. 1936, 218–222], but using anhydrous iron chloride instead of aluminum chloride for the Friedel Crafts condensation.

2-Amino-4-(p-chlorobenzyl)-sulphonyl-phenol of melting point 217° (crystallised from n-butanol) is obtained analogously to 2-amino-4-benzyl-sulphonyl-phenol.

2-Amino-4-isopropyl-sulphonyl-phenol (melting point approx. 128° from methanol-water) and 2-amino-4-n-butylsulphonyl-phenol are obtained analogously to 2-amino-4-n-propyl-sulphonyl-phenol.

EXAMPLE 5

100 parts of terephthalic acid ethylene glycol polyester granules are intimately mixed with 0.05 part of one of the compounds of the formulae (9), (10), (11), (12), (13), (14), (15), (16), (17) or (18) and the mixture is fused at 285°C whilst stirring. After spinning the spinning composition through customary spinning dies, strongly brightened polyester fibres of good fastness to light are obtained.

EXAMPLE 6

1,000 parts of granulated polyamide-6 are mixed with 3 parts of titanium dioxide (rutile modification) and 1 part of one of the compounds of the formulae (9), (10), (11), (12) or (16) in a tumbler vessel for 12 hours. The mixture is fused whilst excluding atmospheric oxygen and the melt is spun in the usual manner. The filaments obtained are strongly brightened.

EXAMPLE 7

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of one of the compounds of the formulae (14), (15), (16), (17) or (18) is milled on a calender at 150°–155° to give an opaque film. This has a significantly higher degree of whiteness than a film which does not contain the optical brightener.

I claim:

1. A stilbene derivative of the formula

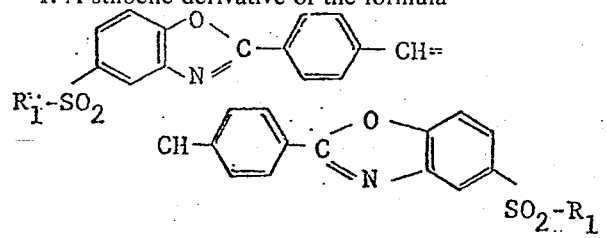

wherein $R_1$ represents an alkyl group with 1 – 4 C atoms, phenyl or benzyl, and phenyl and benzyl can be substituted by chlorine or methyl.

2. A stilbene derivative according to claim 1, corresponding to the formula

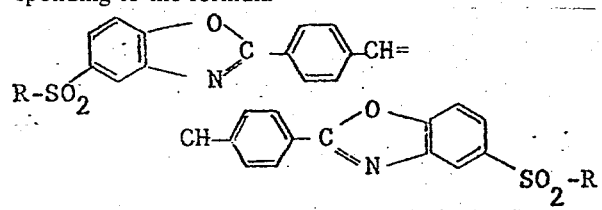

wherein R represents an alkyl group with 1 – 4 C atoms, or phenyl.

3. The compound according to claim 1, corresponding to the formula

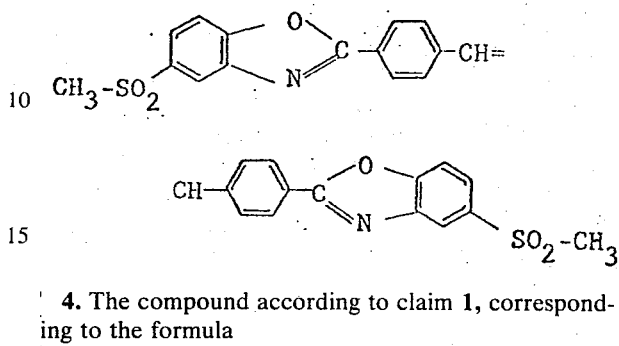

4. The compound according to claim 1, corresponding to the formula

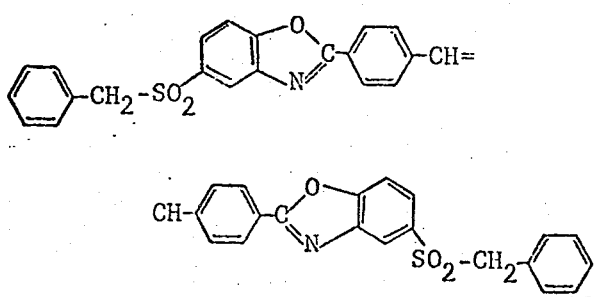

* * * * *